United States Patent
Horne et al.

(10) Patent No.: US 8,411,529 B2
(45) Date of Patent: Apr. 2, 2013

(54) WALKAWAY VSP CALIBRATED SONIC LOGS

(75) Inventors: Stephen Allan Horne, Tokyo (JP); Paolo Primiero, Udine (IT)

(73) Assignee: Schlumberger Technology Corporation, Sugar Land, TX (US)

(*) Notice: Subject to any disclaimer, the term of this patent is extended or adjusted under 35 U.S.C. 154(b) by 595 days.

(21) Appl. No.: 12/685,677

(22) Filed: Jan. 12, 2010

(65) Prior Publication Data

US 2011/0170372 A1     Jul. 14, 2011

(51) Int. Cl.
     *G01V 1/00*         (2006.01)
(52) U.S. Cl. .......................... 367/25; 367/35
(58) Field of Classification Search .................. 367/25, 367/35
See application file for complete search history.

(56) References Cited

U.S. PATENT DOCUMENTS

| | | | |
|---|---|---|---|
| 6,411,902 B1* | 6/2002 | Wiltshire | 702/7 |
| 8,184,502 B2* | 5/2012 | Xu et al. | 367/38 |
| 2003/0167835 A1 | 9/2003 | Sinha et al. | |
| 2007/0115755 A1 | 5/2007 | Grechka et al. | |
| 2009/0225628 A1* | 9/2009 | Sayers | 367/73 |

FOREIGN PATENT DOCUMENTS

| | | |
|---|---|---|
| WO | 2008/154640 | 12/2008 |
| WO | 2009/108432 | 9/2009 |

OTHER PUBLICATIONS

Backus, G.E., "Long-wave elastic anisotropy produced by horizontal layering", Journal of Geophysical Research, 67, 1962, pp. 4427-4440.
de Parscau, J., "P- and SV-wave transversely isotropic phase velocity analysis from VSP data", Geophysical Journal International 107, 1991, pp. 629-638.
Hsu, K., Schoenberg, M. and Walsh, J., "Anisotropy from polarization and moveout", SRG Meeting Expanded Abstracts, 1991, pp. 1526-1529.
Miller, D.E., Leaney, S., and Borland, W.H., "An insitu estimation of anisotropic elastic moduli for a submarine shale", Journal of Geophysical Research, 99, 1994, pp. 21659-21665.
Norris, A. N. and Sinha, B. K., "Weak elastic anisotropy and the tube wave", Geophysics 58, 1993, pp. 1091-1098.
Sato, S., Yamamoto, H., and Cao, D., 2000, "Can Discrepancy between Seismic and Sonic Transit Times be Modeled?", SPWLA.
Sayers, C., "The effect of low aspect ratio pores on the seismic anisotropy of shales", SEG, , 2008, pp. 2750-2754.
Sayers, C., 2005, Seismic anisotropy of shales, Geophysical Prospecting, 53, 667-676.
Schoenberg, M., and Muir, F., "A calculus for finely layered anisotropic media", Geophysics, 54, 1989, pp. 581-589.
Schoenberg, M., Muir, F., and Sayers, C. M., "Introducing ANNIE: a simple three-parameter anisotropic velocity model for shales", Journal of Seismic Exploration, 5, 1996, pp. 35-49.
Sondergeld, C. H., Chandra, S. R., Margesson, R. W., & Whidden, K.J., "Ultrasonic measurement of anisotropy on the Kimmeridge Shale", SEG Annual Meeting Expanded Abstracts, 2000, pp. 1-4.
Thomsen, L., "Weak Elastic Anisotropy", Geophysics, 51, 1986, pp. 1954-1966.

(Continued)

*Primary Examiner* — Isam Alsomiri
*Assistant Examiner* — Krystine Breier
(74) *Attorney, Agent, or Firm* — Jianguang Du; Jody DeStefanis (57) ABSTRACT

Methods and related systems are described relating to processing subsurface sonic and seismic data. The described techniques use anisotropy estimates derived from a walkaway VSP to calibrate elastic properties derived from sonic logs. An empirical relationship between the sonic derived anisotropy parameters is modified until the upscaled elastic properties from the sonic log data best matches the anisotropy parameters measured with the walkway VSP. The result is a set of elastic constants consistent with the walkaway VSP measurements.

20 Claims, 11 Drawing Sheets

OTHER PUBLICATIONS

Tsuneyama, F., and Mavko, G., "Velocity anisotropy estimation for brine-saturated sandstone and shale", The Leading Edge, 2005, pp. 882-888.

Walsh, J., Sinha, B., Plona, T., and Miller, D., Bentley, D., Ammerman, M., "Derivation of anisotropy parameters in a shale using borehole sonic data", SEG Annual Meeting Expanded Abstracts, 2007, pp. 323-327.

Wang, Z., 2002, Seismic anisotropy in sedimentary rocks, part 2: Laboratory data; Geophysics 67 (5) 1423-1440.

Tikhonov A.A. et al., "Integration of Sonic—VSP—Seismic Data for Reservoir Elastic Properties Evaluation", SPE 101588, 2006, Society of petrleum Engineers, 2006 SPE Russian Oil and Gas Technical Conference and Exhibition held in Moscow, Russia Oct. 3-6, 2006.

\* cited by examiner

WALKAWAY VSP CALIBRATED SONIC LOGS

BACKGROUND OF THE INVENTION

1. Field of the Invention

This patent specification relates to sonic logging and borehole seismic data using downhole tools. More particularly, this patent specification relates to systems and methods for combining sonic logging data with borehole seismic data including a calculation of elastic constants describing anisotropy.

2. Background of the Invention

Elastic properties are useful for many applications in subsurface engineering. For example, knowledge of the elastic properties which describe the subsurface seismic velocities is required for accurate imaging by seismic methods. Of particular interest is the elastic anisotropy of a rock, that is, the variation of its mechanical strength with direction. Elastic properties can be derived from sonic logs where high frequency seismic sources are deployed in the well and the resulting waves recorded using receivers that are also deployed in the well. Such sonic logs measure high spatial resolution estimates of the elastic properties around the well bore. Elastic estimates of the region around the well can also be derived from walkaway Vertical Seismic Profiles (VSP).

It is known that the elastic properties of a solid are fully described using 21 elastic constants. However, in many situations the elastic response can be well described using fewer parameters. For example in the case of a solid whose properties are invariant with the direction in which they are measured only two elastic constants are required. Materials with this behavior are called isotropic. Materials whose properties change with direction are called anisotropic with various subsets describing certain types of directional symmetries. A common form of anisotropy that is often observed in the earth is that of Transverse Isotropy where properties change only with respect to a single direction. An example can be constructed from the stacking of thin isotropic layers. The properties of the stack will change only with respect to the layer normal but is otherwise isotropic with respect to the direction transverse to the normal direction. Such Transverse Isotropy (TI) can be described using 5 elastic constants or equivalent parameterizations such as those described by Thomsen (1986) which have been widely adopted in the seismic industry. The Thomsen parameters are; Vp0, Vs0 which are the Compressional and Shear wave velocities along the symmetry axis, and $\epsilon$, $\delta$ and $\gamma$ which are dimensionless parameters describing the directional variations. Thomsen's $\epsilon$ describes the difference in the compressional-wave velocities measured along the symmetry axis and at right angles to it. Similarly, $\gamma$ measures the difference between the shear-wave velocity measured along the symmetry axis and at right angles to it. The third Thomsen parameter, $\delta$, is less easily described as the resulting velocity behavior depends on both $\epsilon$ and $\delta$.

Figure 1A:
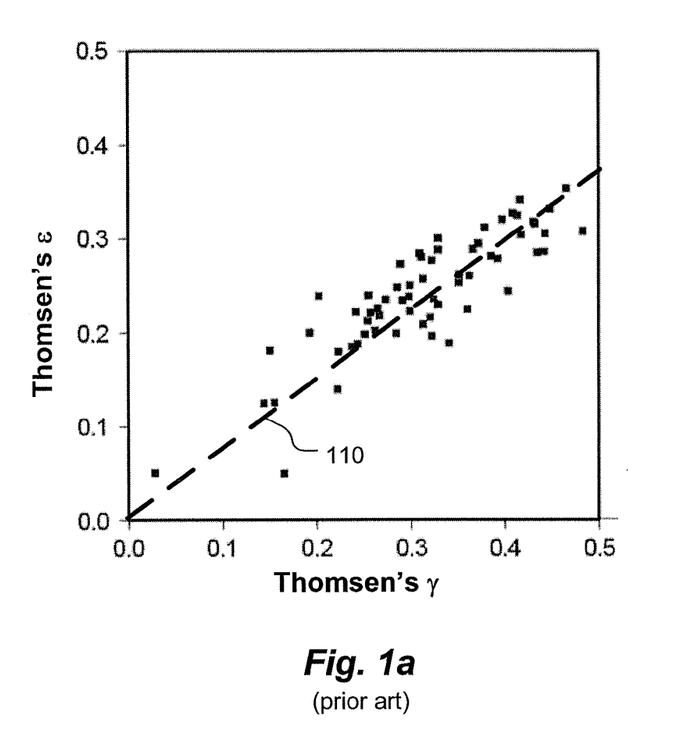
FIGS. 1a-d are a series of plots showing reported measurements of the Thomsen anisotropic parameters of $\epsilon$, $\gamma$ and $\delta$, as is known in the art.
Figure 1B:
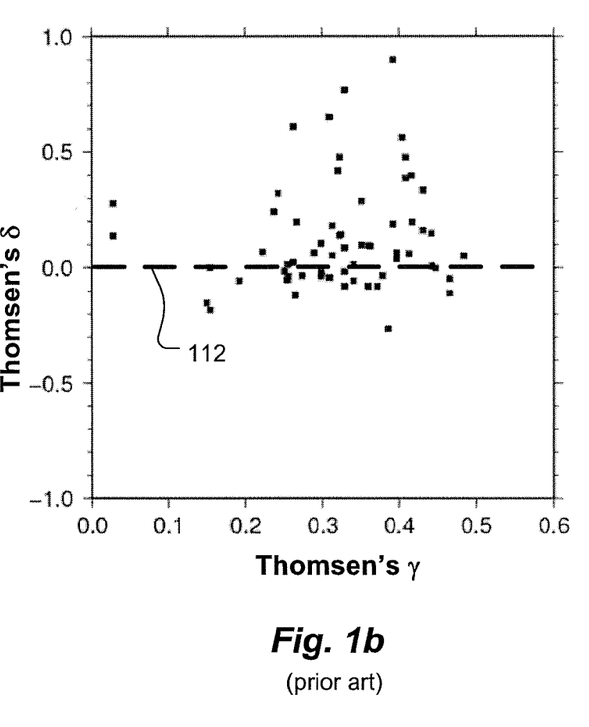
Figure 1C:
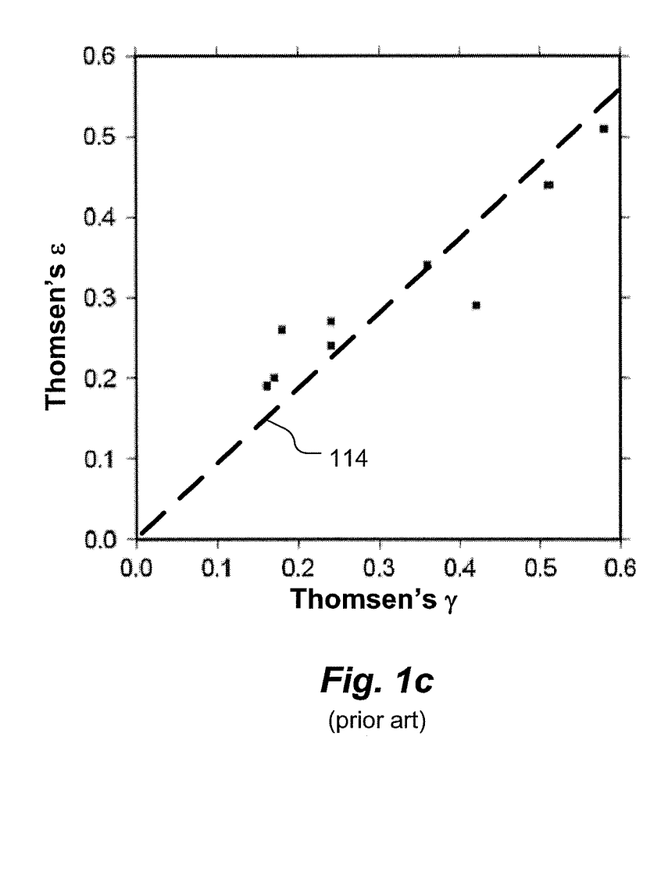
Figure 1D:
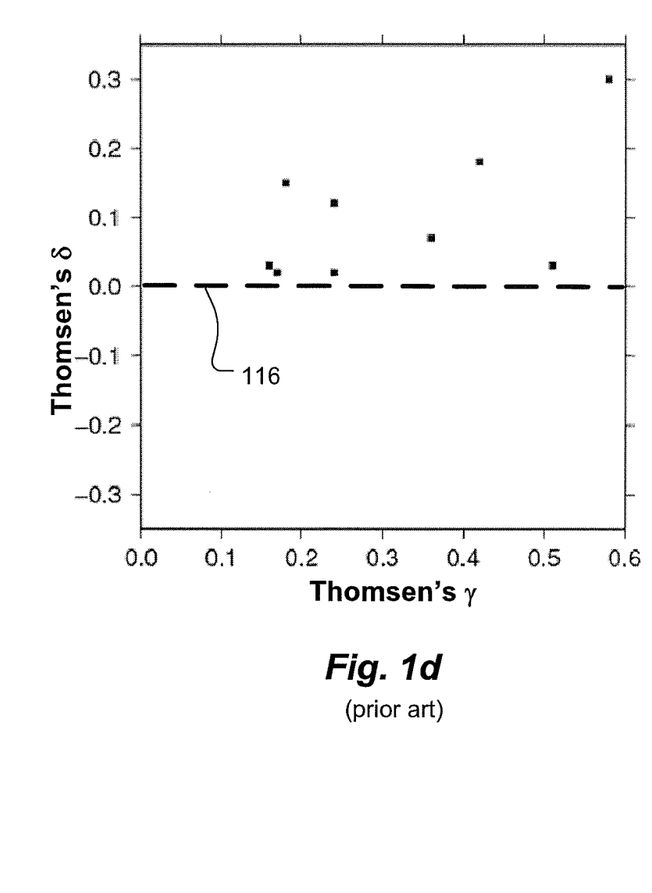

Modern sonic tools such as DSI™ and Sonic Scanner™ from Schlumberger are able to measure four wave types from which two elastic constants can be computed ($C_{44}$ and $C_{66}$) and two other elastic parameters ($mC_{33}$, N) that are a combination of the other elastic constants (See, e.g., Norris, A. N. and Sinha, B. K., 1993, Weak elastic anisotropy and the tube wave, Geophysics 58, 1091-1098, incorporated by reference herein and referred to herein as "Norris and Sinha (1993)"). To resolve all the Thomsen parameters from these four parameters the ANNIE model can be used (See, e.g. Schoenberg, M., Muir, F., and Sayers, C. M., 1996, Introducing ANNIE: A simple three-parameter anisotropic velocity model for shales: Journal of Seismic Exploration, 5, 35-49, incorporated by reference herein and referred to herein as "Schoenberg, Muir, and Sayers (1996)"). The ANNIE model can sometimes be a good approximation for shales and implies that Thomsen's delta is zero. However, such an approximation may not always be appropriate, as is demonstrated in FIGS. 1a-d are a series of plots showing reported measurements of the Thomsen anisotropic parameters of $\epsilon$ and $\delta$, as is known in the art. In particular Thomsen anisotropic parameters of $\epsilon$ and $\delta$ for Kimmeridge Shale is shown in FIGS. 1a and 1b, and for Bakken Shale in FIGS. 1c and 1d. It can be seen in the plots of FIGS. 1b and 1d that Thomsen's $\delta$ parameter is generally not equal to 0 as required by the ANNIE model (line 112 in FIG. 1b and line 116 in FIG. 1d). This suggests that the ANNIE model may not always be a good approximation. However, in FIGS. 1a and 1c we also observe that the Thomsen's anisotropy parameters of $\epsilon$ and $\gamma$ are strongly correlated as has been observed by many authors (see, e.g. Wang, Z., 2002, Seismic anisotropy in sedimentary rocks, part 2: Laboratory data; Geophysics 67 (5) 1423-1440 (referred to herein as "Wang (2002)", Sondergeld, C. H., Chandra, S. R., Margesson, R. W., & Whidden, K. J., 2000, Ultrasonic measurement of anisotropy on the Kimmeridge Shale, SEG Annual Meeting Expanded Abstracts; and Tsuneyama, F., and Mavko, G., 2005, Velocity anisotropy estimation for brine-saturated sandstone and shale, The Leading Edge, 882-888, all of which are incorporated by reference herein). Furthermore this degree of correlation, shown as line 110 in FIG. 1a, and line 114 in FIG. 1c, is formation dependent, in the Kimmeridge shale it is approximately 0.75 and for the Bakken Shale it is approximately 0.97.

The extraction of anisotropy parameters from walkaway VSP measurements can be considered. In general, there are two methods for deriving the elastic constants around the downhole receiver array. The first method is that of the slowness technique, (see, e.g. Miller, D. E., Leaney, S., and Borland, W. H., 1994, An in-situ estimation of anisotropic elastic moduli for a submarine shale, Journal of Geophysical Research, 99, 21659-21665, incorporated by reference herein), which requires a near horizontally layered overburden. The second method is that of slowness-polarization (see, e.g. de Parscau, J., 1991, P- and SV-wave transversely isotropic phase velocity analysis from VSP data. Geophysical Journal International 107, 629-638, incorporated by reference herein), which does not require structural simplicity in the overburden, as does the slowness method. In general these methods extract only four of the Thomsen anisotropy parameters Vp0, Vs0, $\epsilon$ and $\delta$. Thomsen's $\gamma$ is not typically measured with conventional VSPs as this parameter describes the behavior of horizontally polarized shear waves (SH) which are not usually generated by conventional seismic sources.

SUMMARY OF THE INVENTION

According to embodiments, a method for processing subsurface data is provided. The method includes receiving seismic data representing measurements made of seismic energy that has passed through a subsurface formation, and sonic data representing measurements made of sonic energy that has passed through the subsurface formation. The method includes making a first assumption with respect to the subsurface formation, based at least in part on the sonic data, calculating one or more elastic constants that can be used to describe anisotropy of the subsurface formation; comparing attributes of the sonic data with attributes of the seismic data so as to determine if the first assumption is acceptable; and altering the first assumption if the first assumption is not acceptable.

The method preferably also includes calculating one or more effective elastic constants based at least in part on the one or more calculated elastic constants, where the attributes of the sonic data used in the comparison are based at least in part on the effective elastic constants. The calculation of the effective constants preferably also includes a process of upscaling the one or more calculated elastic constants.

The invention is also embodied in a system for processing subsurface. The system includes a processing system that is adapted and programmed to carry out the above described method.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 2:
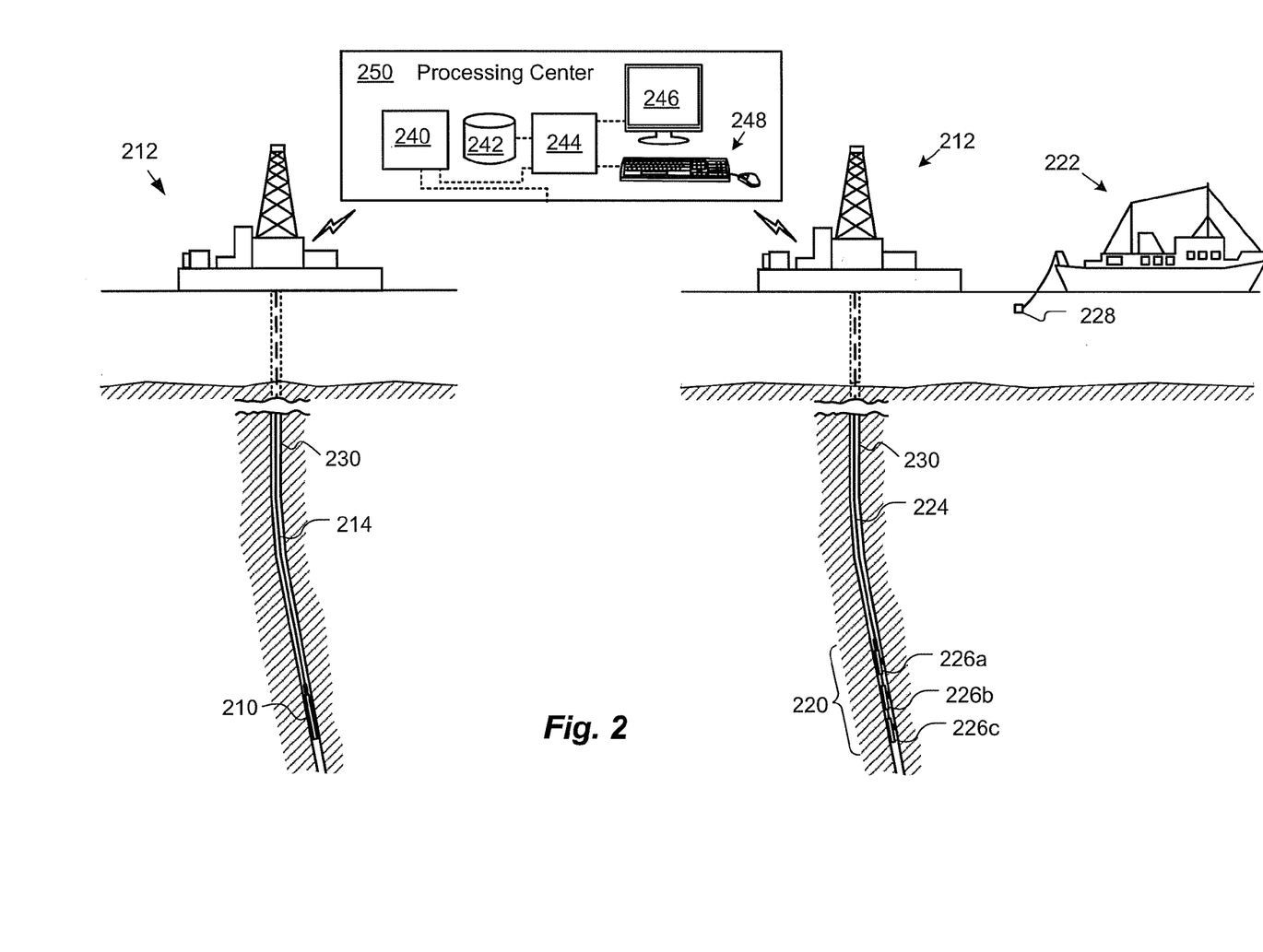
FIG. 2 illustrates a processing system for combining wellbore sonic data and wellbore seismic data, according to some embodiments.

FIG. 2 illustrates a processing system for combining wellbore sonic data and wellbore seismic data, according to some embodiments. A borehole seismic tool 220 is deployed in a well 230 via wireline 224 from platform 212. Seismic tool 220 includes receivers 226a, 226b and 226c which measure seismic waves generated by seismic source 228 deployed by vessel 222 on the surface. Seismic source 228 can be, for example, an air gun cluster, as is known in the art. The source 228 is activated at increasing distances from the well 230 to make "walkaway" vertical seismic profile (VSP) measurements. Measurements from tool 220 are recorded and can be processed in platform 212 and then transmitted to a processing center 250. Processing center 250 includes one or more central processing units 244, storage system 242, communications and input/output modules 240, a user display 246 and a user input system 248.

During a separate operation or the same operation, sonic logging tool 210 is deployed in well 230 via wireline 214 from platform 212. According to some embodiments logging tool 210 is a dipole sonic logging tools such as DSI™ or Sonic Scanner™ from Schlumberger. Measurements from sonic tool 210 include a compressional wave, two shear-waves (fast and slow) and a tube wave. Measurements from tool 210 are recorded and can be processed on platform 212 and then transmitted to a processing center 250. According to some other embodiments, the processing center 250 can be contained on platform 212. According to some embodiments, the sonic tool 210 is deployed in a separate well from well 230 and data is gathered over the same formation of interest as the data from seismic tool 220. Although FIG. 2 is shown in the marine environment, those of skill in the art will recognize that the techniques described herein apply to sonic and seismic data collected from land or transition zone wells. According to some embodiments, for example, well 230 is located on land and one or more logging trucks are used to run tools 210 and 220, and a land seismic source is used.

The seismic measurements from the receivers 226a, 226b and 226c are of a lower spatial resolution than the sonic log measurements from tool 210 because of the differences in the frequencies of the measurements. VSP measurements are of a lower resolution than sonic logs and typically use frequencies of the order of 10 Hz with a corresponding resolution of the order 10 m. For sonic logs the frequency of the elastic waves are typically in the 10,000 Hz range and the resolution of the measurement is of the order of 0.1 m. This scale difference makes the conventional direct comparison of sonic log and VSP data difficult.

One means of reconciling the two scale lengths is through a process known as upscaling. Upscaling is a process that takes high frequency measurements and converts them to an equivalent low frequency response. A conceptual thought experiment clarifies the concept of upscaling. Consider a set of springs that are joined end to end. Each individual spring is defined by a different spring constant and thus will extend by a different amount on the application of an applied force. This serial arrangement of springs can be replaced by a single spring with an equivalent response. The replacement of the serial spring arrangement by a single spring is achieved by upscaling the individual spring constants with a single spring constant that is some average of the individual spring constants. An example of an upscaling process that is commonly used in the seismic industry is that of the Backus average (see, Backus, G. E., 1962, Long-wave elastic anisotropy produced by horizontal layering, Journal of Geophysical Research, 67, 4427-4440, incorporated herein by reference). A Backus average is applied to a set of plane isotropic layers to compute the elastic properties of a single anisotropic layer with the same mechanical properties. This approach was generalized in Schoenberg, M., and Muir, F., 1989, A calculus for finely layered anisotropic media: Geophysics, 54, 581-589 (incorporated by reference herein and referred to herein as "Schoenberg and Muir (1989)") such that the constituent layers can possess arbitrary (triclinic) anisotropy.

With modern dipole sonic logging tools such as Schlumberger's DSI™ or Sonic Scanner™, a compressional wave, two shear-waves (fast and slow) and a tube wave can be measured. Under certain circumstances, these four velocities can be used to determine a subset of the elastic constants and other parameters that are a combination of the elastic constants (see, Norris and Sinha (1993)). The parameters that are a combination of elastic constants can be further decomposed into the underlying elastic constants if additional information is available. This is conventionally done by assuming a certain form of anisotropy, known as the ANNIE model (see, Schoenberg, Muir, and Sayers (1996)).

According to some embodiments, processing center 150 is programmed to use anisotropy estimates derived from walkaway VSPs as a constraint on the upscaled sonic log data to derive a relationship between the anisotropic parameters measured from the sonic logs. This process avoids the use of the ANNIE model that is currently used in processing and which may not always be appropriate.

According to some embodiments the following four elements are used: (1) measurements of anisotropic properties from sonic logs; (2) measurements of anisotropic properties from walkaway VSP over the same depth interval as the sonic log data; (3) a relationship between the Thomsen's $\epsilon$ and Thomsen's $\gamma$; and (4) upscaling a stack of anisotropic layers.

Figure 3:
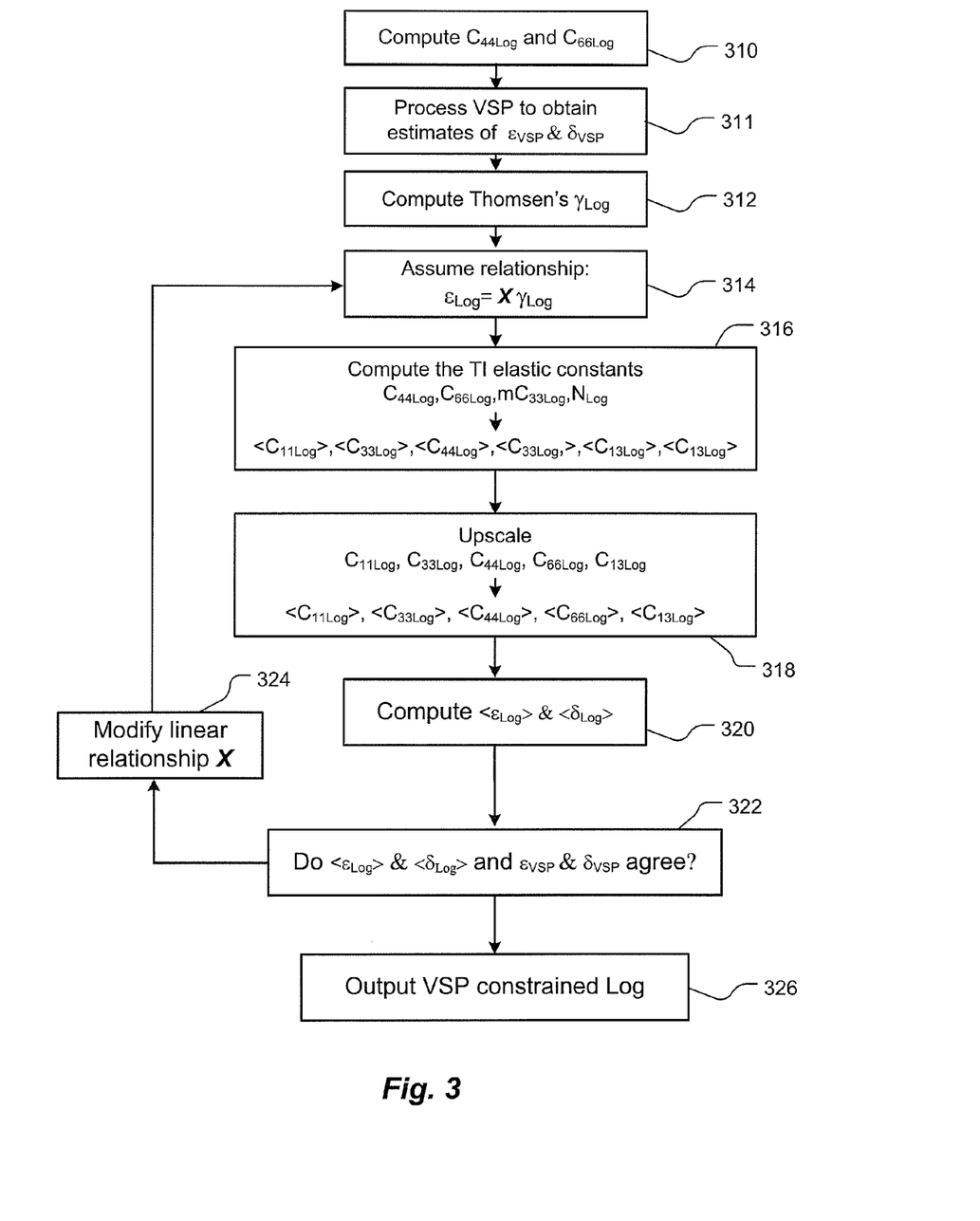
FIG. 3 is a flowchart showing steps involved in combining borehole seismic and borehole sonic data, according to some embodiments.

FIG. 3 is a flowchart showing steps involved in combining borehole seismic and borehole sonic data, according to some embodiments. In step 310, the sonic logs are processed to obtain the parameters $C_{44Log}$, $C_{66Log}$, $mC_{33Log}$ and $N_{Log}$. Suitable processing techniques are described in Norris and Sinha (1993). In step 311, the walkaway VSP data is also processed to derive the anisotropy parameters of $\epsilon_{VSP}$ and $\delta_{VSP}$ and the associated estimated uncertainties associated with these parameters of $\Delta\epsilon_{VSP}$ and $\Delta\delta_{VSP}$. In step 312 Thomsen's $\gamma_{Log}$ parameter is computed over the walkaway VSP depth interval from the sonic log estimates of $C_{44Log}$ and $C_{66Log}$, where:

$$\gamma_{Log} = \frac{C_{66Log} - C_{44Log}}{2C_{44Log}}$$

In step 314, a linear relationship is assumed between Thomsen's $\epsilon_{Log}$ and $\gamma_{Log}$:

$$\epsilon_{Log} = X\gamma_{Log}$$

where X is a correlation coefficient. In step 316, the elastic constants $C_{11Log}$, $C_{33Log}$ and $C_{13Log}$ are computed from $mC_{33Log}$ and $N_{Log}$, where:

$$C_{33Log} = \frac{mC_{33Log}}{2\epsilon_{Log}\sin^2\theta + 1}$$

$$C_{11Log} = C_{33Log}(2\epsilon_{Log} + 1)$$

$$C_{13Log} = \frac{C_{11Log} + C_{33Log} - 4C_{44Log} - N_{Log}}{2}$$

In step 318, an upscaling process, such as described in Schoenberg and Muir (1989), is applied to compute the effective elastic constants $\langle C_{11Log}\rangle$, $\langle C_{33Log}\rangle$, $\langle C_{13Log}\rangle$, $\langle C_{44Log}\rangle$ and $\langle C_{66Log}\rangle$. In step 320, the Thomsen anisotropy parameters, $\langle\epsilon_{Log}\rangle$ and $\langle\delta_{Log}\rangle$ are computed for the averaged medium:

$$\langle\epsilon_{Log}\rangle = \frac{\langle C_{11Log}\rangle - \langle C_{33Log}\rangle}{2\langle C_{33Log}\rangle}$$

$$\langle\delta_{Log}\rangle = \frac{(\langle C_{13Log}\rangle + \langle C_{44Log}\rangle)^2 - (\langle C_{33Log}\rangle - \langle C_{44Log}\rangle)^2}{2\langle C_{33Log}\rangle(\langle C_{33Log}\rangle - \langle C_{44Log}\rangle)}$$

In step 322, $\langle\epsilon_{Log}\rangle$ and $\langle\delta_{Log}\rangle$ are compared with $\epsilon_{VSP}$ and $\delta_{VSP}$ using an appropriate metric f(X) e.g.:

$$f(X) = \left|\frac{\epsilon_{VSP} - \langle\epsilon_{Log}\rangle}{\Delta\epsilon_{VSP}}\right| + \left|\frac{\delta_{VSP} - \langle\delta_{Log}\rangle}{\Delta\delta_{VSP}}\right|$$

where $\Delta\epsilon_{VSP}$ and $\Delta\delta_{VSP}$ are parameter estimation errors from the walkaway VSP anisotropy inversion. In step 324, the correlation coefficient X (as described with respect to step 314) is then modified until the metric described with respect to step 322 is minimized so that there is a good agreement between the two sets of anisotropy parameters. In step 326, when there is suitable agreement, the optimal linear relationship derived is then used to compute the elastic constants over the interval.

In the case that the walkaway VSP anisotropy results span heterogeneous formations it is possible to search for correlation coefficients depending on the formation type. For example, if the VSP spans a shale interval and a sandstone interval it may be useful to search for the correlation coefficient only in the shale interval (as indicated by the gamma ray log) and assume that the sandstone is elliptically anisotropic, which is the usual case for sandstones (see, Wang, (2002)).

It is important to note that the above-described techniques are not attempting to directly match the elastic constants, or velocities, but only the dimensionless anisotropic parameters. This is done because the velocities derived from high frequency log measurements are different from those measured with lower frequency seismic measurements such as VSPs due to attenuation, dispersion and anisotropy (Sato, S., Yamamoto, H., and Cao, D., 2000, Can Discrepancy between Seismic and Sonic Transit Times be Modeled?, SPWLA, which is incorporated herein by reference). For this reason it is preferable to match the dimensionless anisotropic parameters which are expected to be less sensitive to these frequency dependent effects.

We also note that the recovered correlation coefficient can be related to the degree of fluid saturation in rocks as discussed in Sayers, C., 2008, The effect of low aspect ratio pores on the seismic anisotropy of shales, SEG, incorporated herein by reference.

Various embodiments can be demonstrated using a synthetic dataset and can then be applied to a field dataset comprising sonic logs, walkaway VSP and core measurements acquired for the purposes of determining the elastic properties on a sealing shale unit.

SYNTHETIC EXAMPLE

The concept has been tested on synthetic data constructed as follows: (1) Build synthetic 1D logs based on the field data example using the relation $\epsilon=\gamma$; (2) Model the arrival times corresponding to a walkaway VSP geometry; (3) Construct slowness curves from the synthetic walkaway VSP data; (4) Invert the slowness curve to obtain the anisotropy parameters at the VSP scale; and (5) Upscale the synthetic log and calibrate the Thomsen anisotropy parameters of $\epsilon$ and $\delta$ with the proposed method.

Using the anisotropy values derived from the VSP we apply the invention to find that the optimal correlation coefficient between $\epsilon$ and $\gamma$ to be 1.0, the correct value.

Figure 4A:
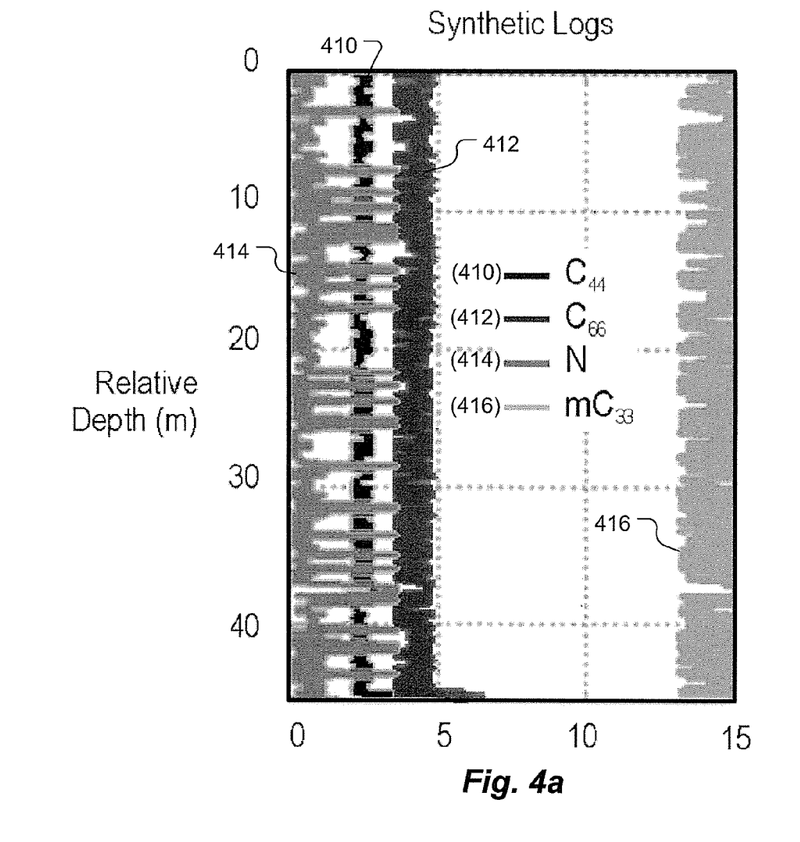
FIGS. 4a and 4b are plots relating to a described synthetic example, according to embodiments.
Figure 4B:
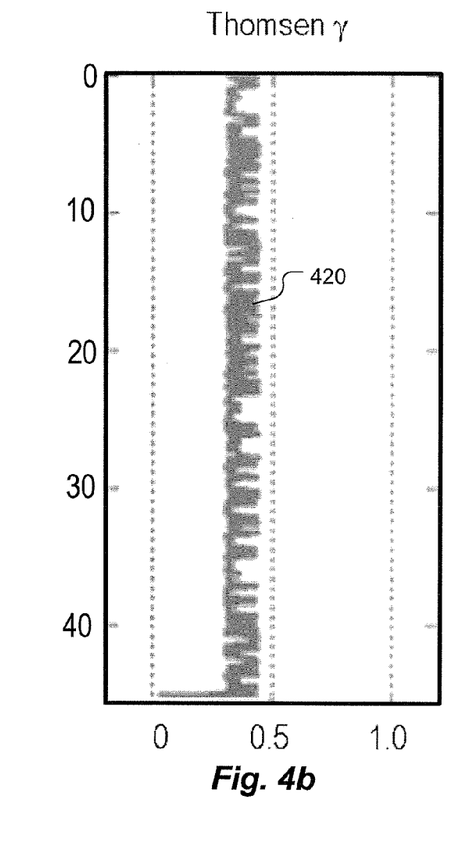

FIGS. 4a and 4b are plots relating to the described synthetic example. In particular in FIG. 4a plots 410, 412, 414 and 416 are synthetic logs for $C_{44}$, $C_{66}$, N and $mC_{33}$ respectively, versus relative depth according to the synthetic example. In FIG. 4b plot 420 is Thomsen's $\gamma$ versus relative depth according to the synthetic example.

Figure 5:
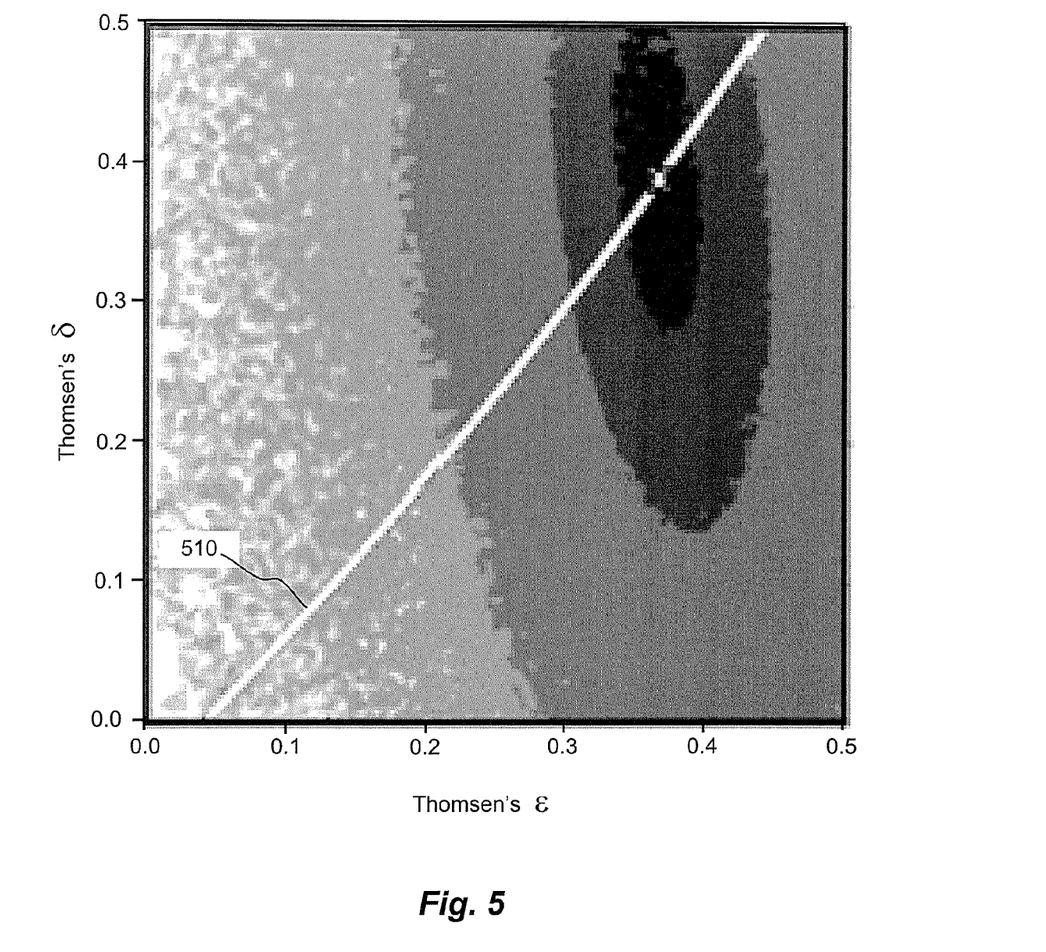
FIG. 5 shows synthetic walkaway VSP inversion results and upscaling results for the log data, according to the synthetic example.

FIG. 5 shows synthetic walkaway VSP inversion results, according to the synthetic example. In particular, the inverted parameters of Thomsen's $\epsilon$ vs. Thomsen's $\delta$ are shaded according to the likelihood function value (darker shades are more likely solutions to the data). The most likely solution is for Thomsen's $\epsilon$=0.36 and $\delta$=0.39, as indicated by the circle. Overlain on this plot are the Thomsen's parameters derived by upscaling the elastic parameters as the correlation coefficient is changed (white line 510). The closest match obtained is indicated by the square which overlies the anisotropy parameters found from the VSP data.

Figure 6:
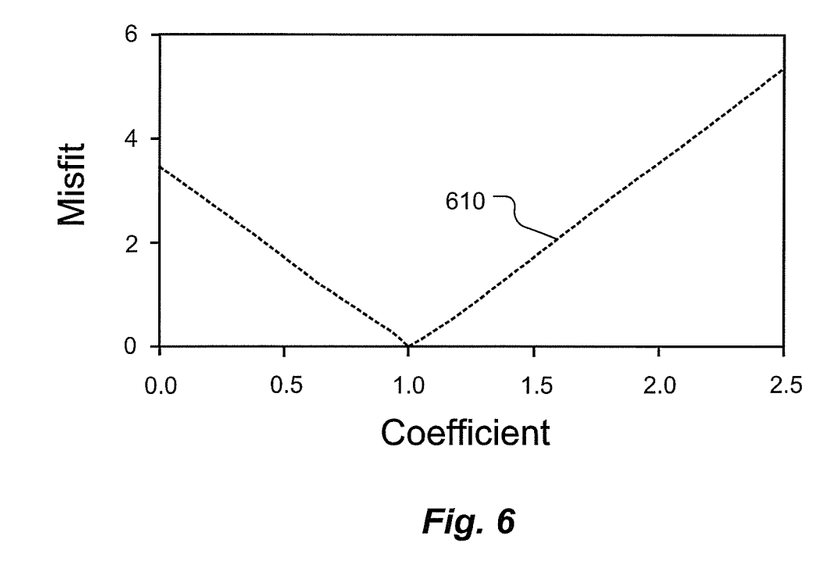
FIG. 6 shows the objective function as a function of the calibration coefficient for the synthetic data example.

FIG. 6 is a plot showing the objective function derived from the synthetic example. The objective function, shown by line 610, measures the difference between the anisotropy parameters derived from the walkaway VSP and the upscaled Sonic Logs as the correlation coefficient is changed. The best match between the walkaway VSP and the upscaled sonic logs occurs for a calibration coefficient of 1.0, corresponding to the relation $\epsilon=\gamma$.

FIELD DATA EXAMPLE

To test the invention we use data from a North Sea field where walkaway VSP, dipole sonic logs and core measurements were obtained to characterize a known anisotropic shale formation.

The walkaway VSP was acquired using an eight-level receiver array that spanned the anisotropic shale. Since the overburden was essentially flat the slowness curve method was used to compute anisotropy estimates for the shale formation. The inverted Thomsen anisotropy parameters for the slowness curve are $\epsilon_{VSP}$=0.15 and $\delta_{VSP}$=0.02.

Dipole sonic logs from a neighboring well that intersects the same shale formation sampled by the walkaway VSP were processed using processing techniques such as described in Norris and Sinha (1993) to give $C_{44Log}$, $C_{66Log}$, $mC_{33Log}$ and $N_{Log}$.

Figure 7:
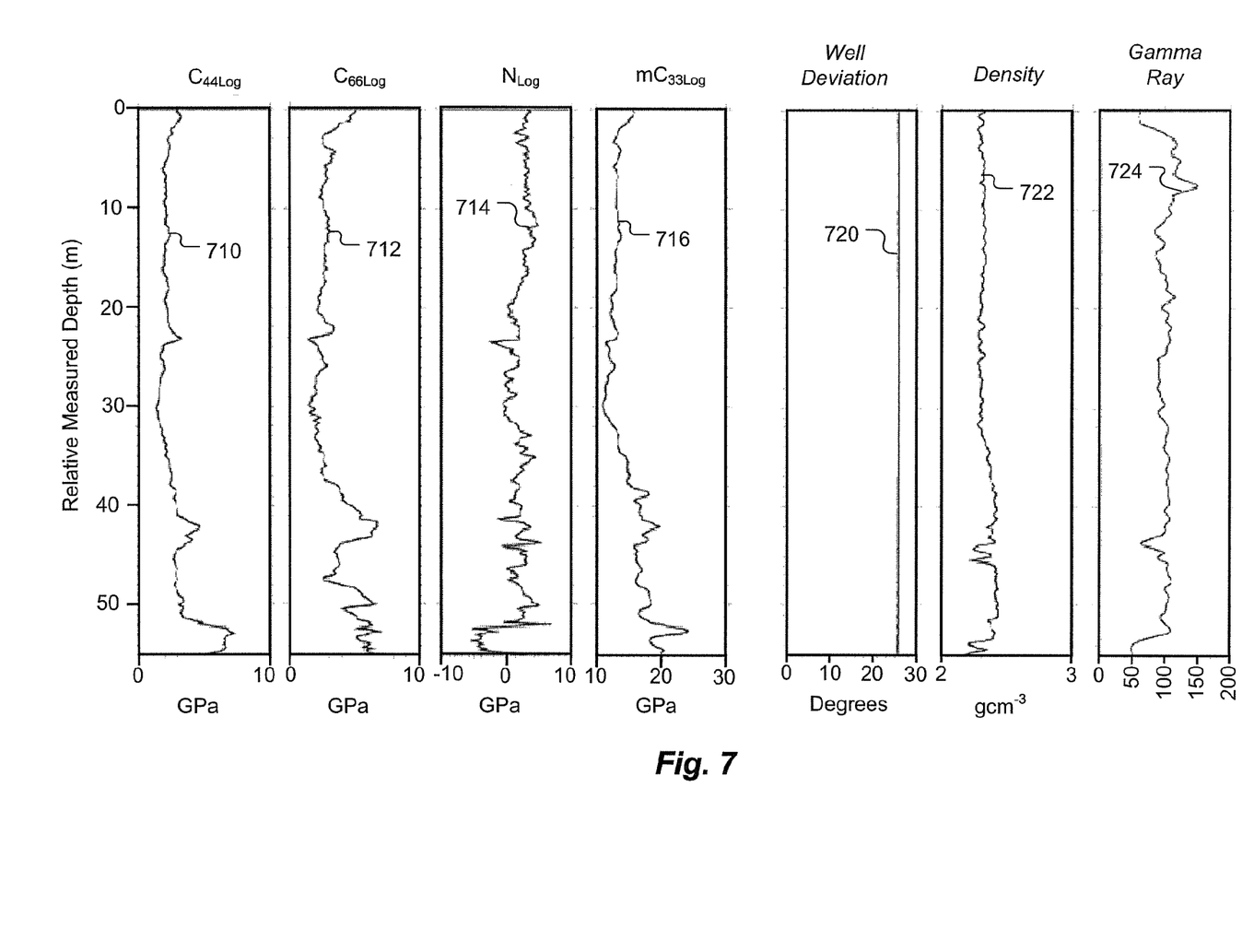
FIG. 7 shows dipole sonic log properties derived according to some embodiments.

FIG. 7 shows dipole sonic log properties derived according to some embodiments. In the first four panels, plots 710, 712, 714 and 716 show the computed elastic parameters for $C_{44Log}$, $C_{66Log}$, $N_{Log}$ and $mC_{33Log}$ respectively. In following panels, plots 720, 722 and 724 show, well deviation, density, and the gamma ray log, respectively.

Figure 8:
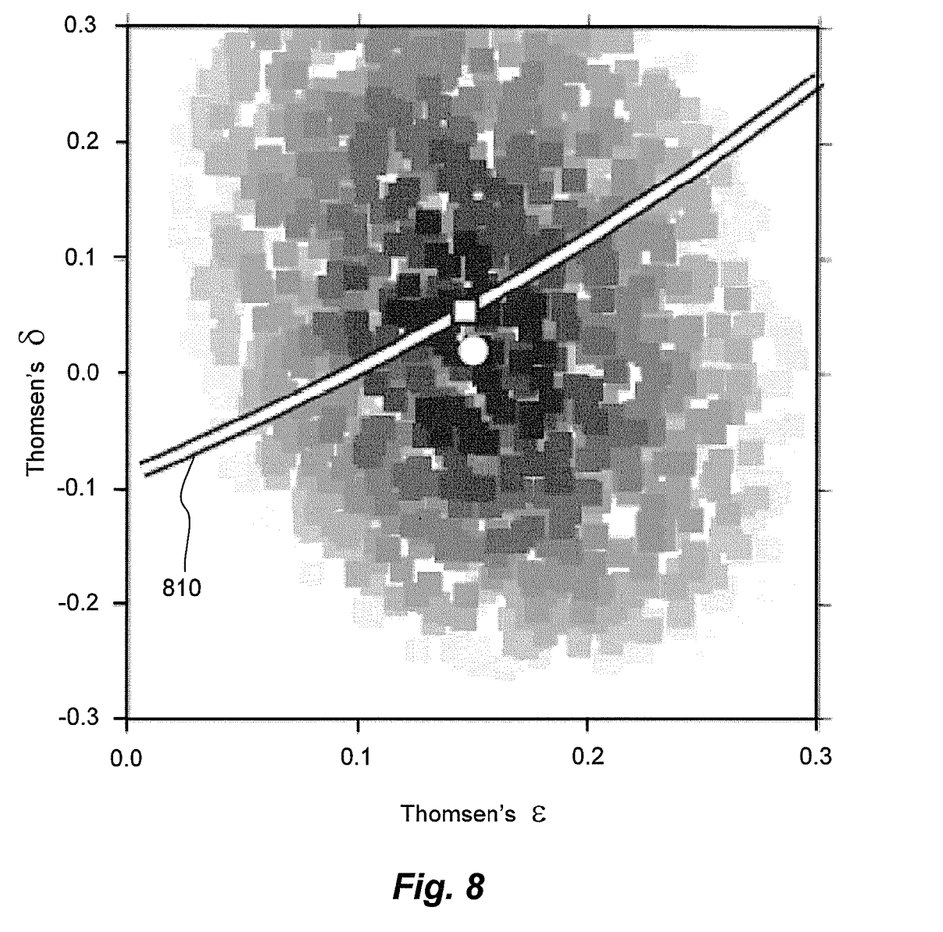
FIG. 8 shows walkaway VSP inversion results and upscaling results for the log data, according to the field data example.

FIG. 8 is a plot for Thomsen's $\epsilon$ and $\delta$ parameters, according to some embodiments. This plot shows a comparison of $\epsilon_{VSP}$ and $\delta_{VSP}$ (shown with the circle) and the best matching $<\epsilon_{Log}>$ and $<\delta_{Log}>$ (shown with the square). The gray colored squares show results from a Monte Carlo inversion of the VSP data for the anisotropy parameters and are shaded according to the goodness of fit such that darker shades correspond to the better fitting models. The best fitting model for the VSP data has anisotropy parameters of $\epsilon_{VSP}$=0.15 and $\delta_{VSP}$=0.02 (as indicated by the circle). The continuous white line 810 corresponds to anisotropy parameters computed from the upscaled logs as the empirical relation is modified. The closest match to the VSP data lies at $<\epsilon_{Log}>$=0.15 and $<\delta_{Log}>$=0.05 (as indicated by the square).

Figure 9:
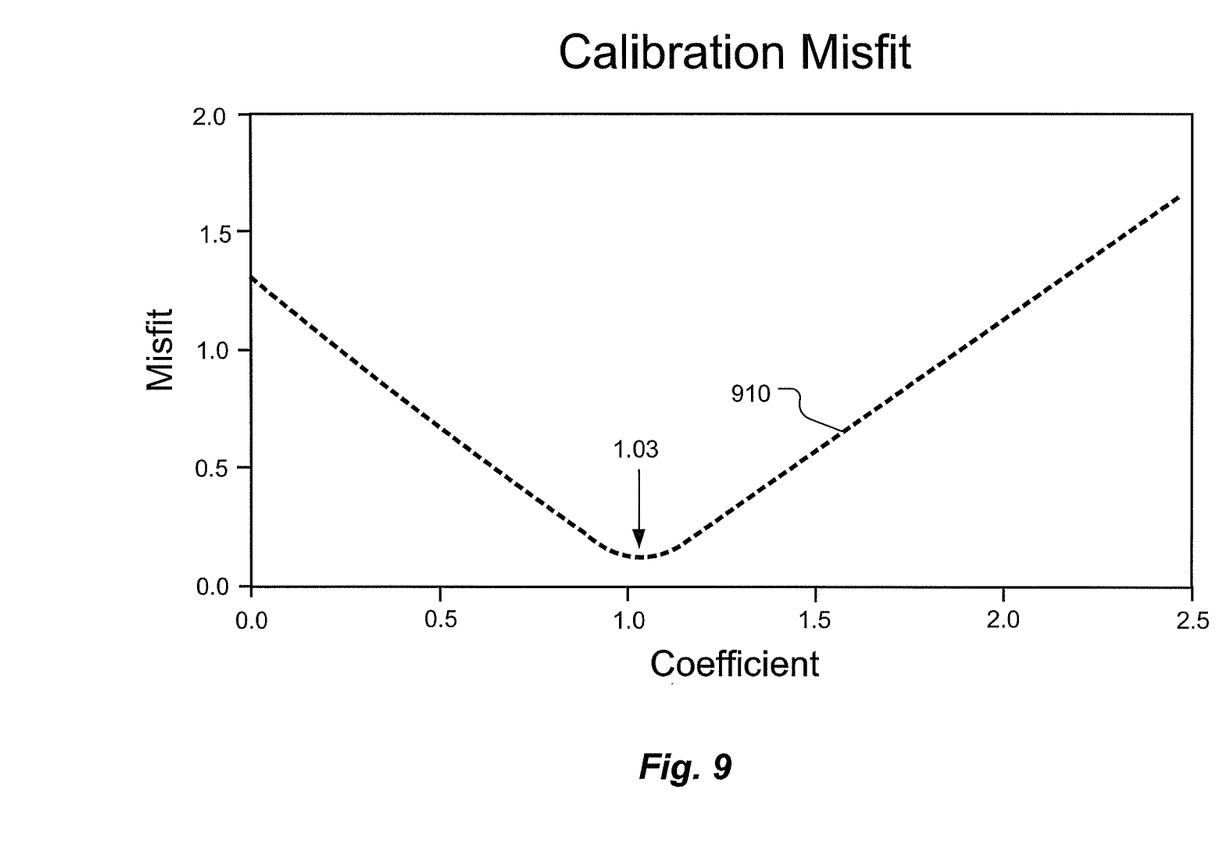
FIG. 9 shows the objective function as a function of the calibration coefficient for the field data example.

FIG. 9 shows the objective function as a function of the calibration coefficient. From line 910, it can be seen that the best match between the upscaled log values of $<\epsilon_{Log}>$ and $<\delta_{Log}>$ and the anisotropic values observed in the VSP at $\epsilon_{VSP}$=0.15 and $\delta_{VSP}$=0.02 occurs for a calibration coefficient of 1.03.

As can be seen from FIGS. 8 and 9, application of the described embodiments provides a best match between the upscaled dipole sonic log data and the walkaway VSP results for a correlation coefficient of 1.03.

Figure 10A:
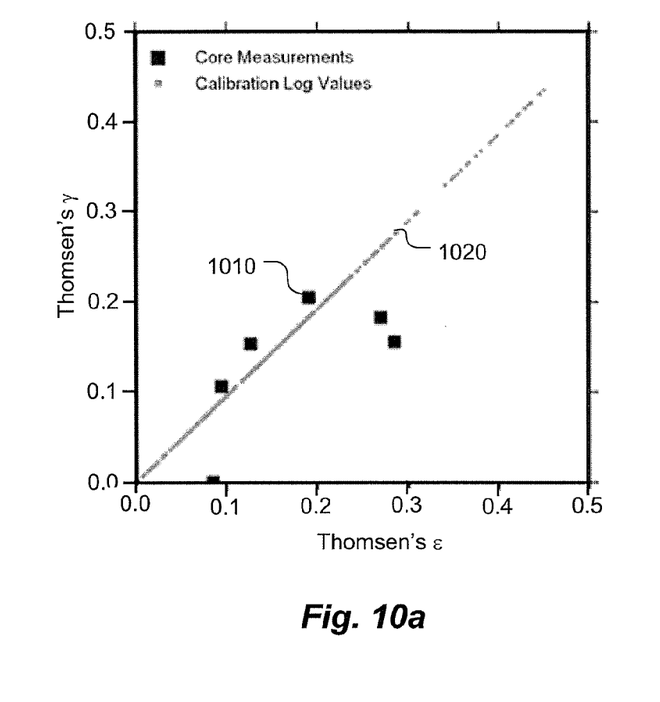
FIGS. 10a and 10b show computed anisotropy parameters for the calibrated log and compare these with anisotropy measurements derived from the cores
Figure 10B:
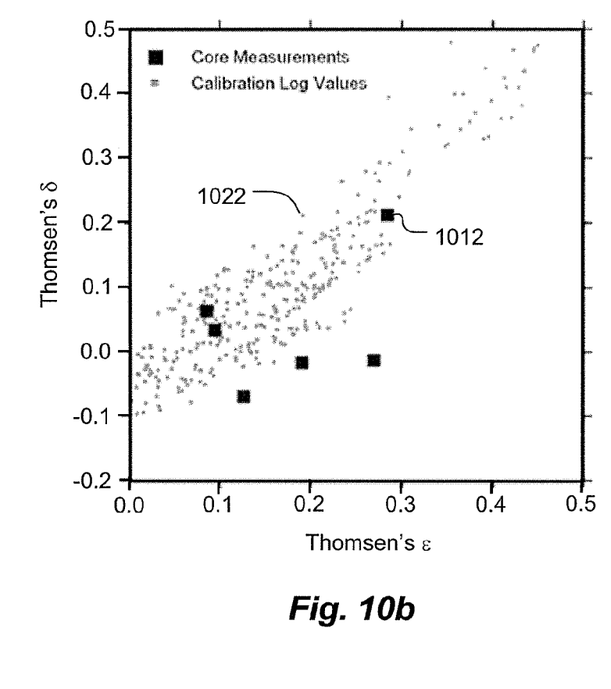

Published laboratory studies based on core measurements have shown that the correlation coefficient between Thomsen's $\epsilon$ and $\gamma$ to be 1.05. For example, see Wang (2002). FIGS. 10a and 10b show computed anisotropy parameters for the calibrated log compared with anisotropy measurements derived from core measurements. In particular, Thomsen's $\epsilon$, $\delta$ and $\gamma$ measurements derived from core (large black squares, such as square 1010 in FIG. 10a, and square 1012 in FIG. 10b) measurements are compared with the predicted values (small gray squares, such as square 1020 in FIG. 10a, and square 1022 in FIG. 10b.) which are computed from the calibrated log. We can see that the estimated anisotropy parameters are in good agreement with the core measurements of anisotropy.

Many of the embodiments described herein have been described with respect to Thomsen's anisotropy parameters. However, those of skill in the art will recognize that the described techniques can be applied to other anisotropy parameters. For example, according some embodiments, Schoenberg anisotropy parameters ellipticity and anellipticity are used in connection with the techniques described herein.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:
1. A method for processing subsurface data comprising:
receiving seismic data representing measurements made of seismic energy that has passed through a subsurface formation;

receiving sonic data representing measurements made of sonic energy that has passed through the subsurface formation;

making a first assumption with respect to the subsurface formation based at least in part on the sonic data, wherein the first assumption includes a relationship between sonic anisotropy parameters of the sonic data;

calculating, by a processor and based on the assumed relationship and the sonic data, one or more elastic constants that can be used to describe anisotropy of the subsurface formation;

calculating one or more sonic anisotropy parameters of the sonic data based on the one or more elastic constants;

comparing the one or more sonic anisotropy parameters of the sonic data with one or more seismic anisotropy parameters of the seismic data so as to determine if the first assumption is acceptable based on a metric;

altering the first assumption if the first assumption is not acceptable; and outputting a log of the sonic data based at least in part on the calculated elastic constants if the first assumption is acceptable.

2. The method according to claim 1 further comprising calculating one or more effective elastic constants based at least in part on the one or more calculated elastic constants, where the one or more sonic anisotropy parameters of the sonic data used in the comparison are based at least in part on the effective elastic constants.

3. The method according to claim 2 wherein calculating of the one or more elastic constants includes a process of upscaling the one or more calculated elastic constants.

4. The method according to claim 1 wherein the one or more anisotropy parameters are Thomsen anisotropy parameters selected from the group consisting of: $\epsilon$, $\delta$, and $\gamma$.

5. The method according to claim 4 wherein the first assumption includes a relationship between two Thomsen anisotropy parameters selected from the group consisting of: $\epsilon$, $\delta$, and $\gamma$.

6. The method according to claim 5 wherein the relationship is a linear relationship including a correlation coefficient, the first assumption including an assumption of the value for the correlation coefficient, and the altering of the first assumption includes modifying the value for the correlation coefficient.

7. The method according to claim 1 wherein the calculated elastic constants include one or more constants selected from the group consisting of: $c11$, $c12$, $c13$, $c14$, $c15$, $c16$, $c22$, $c23$, $c24$, $c25$, $c26$, $c33$, $c34$, $c35$, $c36$, $c44$, $c45$, $c46$, $c55$, $c56$, $c66$.

8. The method according to claim 1 further comprising calculating further elastic constants for the formation based at least in part on an acceptable altered first assumption.

9. The method according to claim 8 further comprising outputting a log of the sonic data based at least in part on the further calculated elastic constants.

10. A system for processing subsurface data comprising a processing system programmed and configured to:

receive seismic data representing measurements made of seismic energy that has passed through a subsurface formation;

receive sonic data representing measurements made of sonic energy that has passed through the subsurface formation;

make a first assumption with respect to the subsurface formation based at least in part on the sonic data, wherein the first assumption includes a relationship between sonic anisotropy parameters of the sonic data;

calculate, based on the assumed relationship and the sonic data, one or more elastic constants that can be used to describe anisotropy of the subsurface formation;

calculate one or more sonic anisotropy parameters of the sonic data based on the one or more elastic constants;

compare the one or more sonic anisotropy parameters of the sonic data with one or more seismic anisotropy parameters of the seismic data so as to determine if the first assumption is acceptable based on a metric;

altering the first assumption if the first assumption is not acceptable; and outputting a log of the sonic data based at least in part on the calculated elastic constants if the first assumption is acceptable.

11. The system according to claim 10 wherein the processing system is further programmed and configured to calculate one or more effective elastic constants based at least in part on the one or more calculated elastic constants, where the one or more sonic anisotropy parameters of the sonic data used in the comparison are based at least in part on the effective elastic constants.

12. The system according to claim 11 wherein calculation of the one or more elastic constants includes a process of upscaling the one or more calculated elastic constants.

13. The system according to claim 10 wherein the one or more anisotropy parameters are Thomsen anisotropy parameters selected from the group consisting of: $\epsilon$, $\delta$, and $\gamma$.

14. The system according to claim 13 wherein the first assumption includes a relationship between two Thomsen anisotropy parameters selected from the group consisting of: $\epsilon$, $\delta$, and $\gamma$.

15. The system according to claim 14 wherein the relationship is a linear relationship including a correlation coefficient, the first assumption including an assumption of the value for the correlation coefficient, and the alteration of the first assumption includes a modification of the value for the correlation coefficient.

16. The system according to claim 10 wherein the elastic constants include one or more constants selected from the group consisting of: $c11$, $c12$, $c13$, $c14$, $c15$, $c16$, $c22$, $c23$, $c24$, $c25$, $c26$, $c33$, $c34$, $c35$, $c36$, $c44$, $c45$, $c46$, $c55$, $c56$, $c66$.

17. The system according to claim 10 wherein the processing system is further programmed and configured to calculate further elastic constants for the formation based at least in part on an acceptable altered first assumption.

18. The system according to claim 17 wherein the processing system is further programmed and configured to output a log of the sonic data based at least in part on the further calculated elastic constants.

19. The system according to claim 10 further comprising a sonic tool system adapted and configured to be deployed downhole and record the sonic data.

20. The system according to claim 10 further comprising a borehole seismic tool system adapted and configured to be deployed downhole and record the seismic data.

* * * * *